United States Patent [19]
Bailleul et al.

[11] Patent Number: 4,950,084
[45] Date of Patent: Aug. 21, 1990

[54] CAPACITIVE SENSOR

[75] Inventors: Gilles Bailleul, Montesson; Carlos Rodrigues, Le Chesnay; Samin Albijat, Puteaux, all of France

[73] Assignee: U.S. Philips Corporation, New York, N.Y.

[21] Appl. No.: 324,471

[22] Filed: Mar. 16, 1989

[30] Foreign Application Priority Data

Mar. 25, 1988 [FR] France ............................. 88 03939

[51] Int. Cl.⁵ ..................... G01K 13/08; G01K 7/00
[52] U.S. Cl. ................................. 374/144; 361/181; 374/184
[58] Field of Search .................. 374/144, 142, 184; 324/61 R; 361/181; 340/840.34

[56] References Cited

U.S. PATENT DOCUMENTS

| | | | |
|---|---|---|---|
| 2,842,738 | 7/1958 | Warnick | 324/61 R |
| 3,926,053 | 12/1975 | Schurrer et al. | 374/142 X |
| 4,063,167 | 12/1971 | Duly | 324/61 R |
| 4,130,019 | 12/1978 | Nitschke | 374/181 X |
| 4,823,071 | 4/1989 | Ding et al. | 324/61 R |

FOREIGN PATENT DOCUMENTS

2071852 9/1981 United Kingdom .

Primary Examiner—Daniel M. Yasich
Attorney, Agent, or Firm—Robert T. Mayer

[57] ABSTRACT

The invention relates to a capacitive sensor for the measurement, under dynamic conditions, of at least one characteristic of a turbo-machine, this sensor comprising a conductive surface intended to be fixed to the casing near a succession of rotating blades to form the first plate of a capacitor, the second plate of which consists, in succession, of each one of the ends of the rotating blades when these ends pass in proximity to this conductive surface. This sensor comprises an electrical interconnection means to connect this conductive surface to first electrical detection means for measuring the variations of the capacitance of the capacitor thus formed. According to the invention, this electrical interconnection means also constitutes a means for connecting this conductive surface to second electrical detection means for measuring the temperature of the casing in the region of fixing of the said conductive surface.

7 Claims, 6 Drawing Sheets

CAPACITIVE SENSOR

DESCRIPTION

The invention relates to a capacitive sensor for the measurement, under dynamic conditions, of at least one characteristic of a turbo-machine, this sensor comprising a conductive surface intended to be fixed to the casing near a succession of rotating blades to form the first plate of a capacitor, the second plate of which consists, in succession, of each one of the ends of the rotating blades when these ends pass in proximity to this conductive surface, and comprising an electrical interconnection means to connect this conductive surface to first electrical detection means for measuring the variations of the capacitance of the capacitor thus formed.

The invention finds its application, especially, in aeronautics. In this field, considerable progress has been obtained during recent years in the specification and the development of high-performance and high-output turbojets. However, nowadays, it is becoming progressively more difficult, in view of the level already achieved, to increase further the output of such machines to a significant etent, except by devoting a very great deal of attention to specific points which have not, as yet, received a great deal of study but which are capable of leading to new improvements in output which are of considerable significance.

Thus, it is already known from the prior art that the magnitude of the clearance between the ends of the blades and the casing of a turbo-machine is a parameter which is important as regards the performance levels of an engine.

A capacitive sensor as described in the preamble is known from the Patent GB No. -2,071,852. This sensor comprises an electrode having a circular conductive surface and a conductive wire which extends from the electrode to the exterior of the sensor and which is surrounded by a cylindrical metallic sheath, from which it is separated by a mineral insulator. The electrode, the conductive wire and the sheath are retained by a cylindrical metallic sleeve insulated from the electrode by a cylindrical intermediate sleeve made of ceramic. A system for shielding the sensor is, in addition, provided. The metallic sleeve is fixed on the casing of a turbo-machine through an opening formed in the wall of this casing, near a succession of blades of the rotor, in such a manner what the conductive surface of the electrode is integral with the casing and aligned with the internal surface of the latter. Each blade end forms, together with the conductive surface, a capacitor, the capacitance of which is a function of the distance which separates this blade end from the said conductive surface. The conductive wsire of this sensor permits the incorporation of the capacitor thus formed in an oscillating circuit. The frequency of the output signal of this oscillating circuit is then a function of the capacitance of this capacitor, and thus a function of the clearance between the blade ends and the casing.

Such a capacitive sensor is also known from the Patent FR No. -2,506,023. This document describes an applicatio of this sensor for the determination of the speed of a turbine. To this end, a self-inductive element is associated with a capacitor similar to the capacitor described hereinabove, in order to form a resonant circuit. This resonant circuit is coupled to an oscillator, of which it determines the operating frequency in such a manner that the output signal of this oscillator is frequency-modulated in the rhythm of passage of the ends of the blades in front of the conductive surface of the sensor.

Furthermore, the Patent GB No. 2,071,852 teaches that the output signal of an oscillating circuit including such a sensor may be used to drive a slaved control system in such a manner as to cause variation of the effective internal diameter of the casing and thus to cause variation of the clearance between the blade ends and the casing. However, this document does not teach how this result is obtained.

In fact, a person skilled in the art is entirely aware that turbo-machines are equipped with flexible hoses which are wound around the casing and which are intended for the circulation of a fluid to heat or to cool the turbine, as a function not of the actual state of the engine, but of the theoretical state following from the flight plan, and thus to cause variation of the expansion of the.casing.

The technical problem posed in thus that of being able to activate the system for cooling or for heating the casing not on the basis of a necessarily approximate flight plan provided in advance, but by a slaving driven by a measurement which depends upon the actual state of the engine, in such a manner as to control fully the value of the clearance between rotating blade ends and casing.

The solution to such a problem will permit quite appreciable gains in output to be obtained. In fact, it is necessary to be aware that a loss of 1% of the output of an engine, due to the clearance between blades and casing, results in an increase of the consumption of fuel of the order of 2 to 4%, depending upon the type of engine.

According to the invention, this problem is solved by means of a sensor as described in the preamble, characterized in that the electrical interconnection means also constitutes a means for connecting this conductive surface to second electrical detection means for measuring the temperature of the casing in the region of fixing of the said conductive surface.

In fact, the problem of the slaving which permits the control of the value of the clearance between a given blade and the casing is actually well presented only if consideration is given to the fact that the development of this clearance during operation is essentially a function of the temperature of the point at which the clearance is measured. The knowledge of the temperature at this precise point thus constitutes an essential element.

According to the invention, this problem is particularly well solved by such a sensor, characterized in that the electrical interconnection means is formed from the conductors of a thermocouple and from means for placing the weld point of the thermocouple in electrical and thermal contact with the conductive surface.

One of the objects of the invention is also to propose such a sensor operating within the range of the temperatures whieh prevail within a turbojet, that is to say 600° to 750° C., this being applicable with a reasonable production cost.

According to the invention, this problem is solved by such a sensor which is further characterized in that the means for placing the weld point of the thermocouple in electrical and thermal contact with the conductive surface comprises at least one metallic electrode, equipped with a plane front face which cooperates with the conductive surface, the weld point of the thermocouple being in electrical and thermal contact with this electrode.

In an embodiment of the invention, this sensor is characterized in that the thermocouple is of the shielded type with a mineral insulator, the shielding being provided by a cylindrical metallic sheath, and this shielding being interrupted in proximity to the weld point of the thermocouple to leave the conductors and the weld point stripped over a small length to permit the placing of the weld point of the thermocouple in electrical and thermal contact with the electrode.

In a preferred embodiment of the invention, this sensor is characterized in that an insulating intermediate piece made of ceramic is sealingly brazed onto the electrode, and a metallic sensor body is sealingly brazed both onto the sheath of the thermocouple and onto the intermediate insulating piece, the body of the sensor and the intermediate piece being equipped with axial recesses to allow the sheath of the thermocouple to pass.

The invention will be better understood by means of the description which follows, illustrated by the accompanying figures, in which:

FIG. 3a shows a third embodiment of the sensor according to the invention, in external longitudinal view;

FIG. 3c shows this same sensor in transverse cross-section along the axis E—E of FIG. 3b, and FIG. 3d along the axis F—F;

It is recalled, first of all, that a turbomachine in general comprises at least:

a chamber for the compression of the gases, which chamber is formed of a casing or stator equipped with fixed blades, in which a bladed wheel or rotor rotates. The fixed blades are alternate with the rotating blades, and the end of the latter moves at a distance of the order of 1/10 mm from the internal wall of the casing. This distance or clearance of the rotating blade ends is therefore very critical. The temperature which prevails in this zone ranges from 500° to 750° C.;

a combustion chamber, where the fuel is injected and burnt;

a pressure reduction chamber where the compressed burnt gases are directed towards the outlet of the turbine. This chamber also comprises, like the combustion chamber, a stator and a bladed rotor. However, the temperatures within this zone are of the order of 1300° C.;

systems for stiffening the rotor, to prevent excessively large deformations;

systems of flexible hoses which are wound outside the stator for the circulation of heating or cooling fluids, which is driven as a function of a flight plan drawn up in advance.

The sensor according to the invention is especially intended to be used in a compression chamber.

Figure 5A:
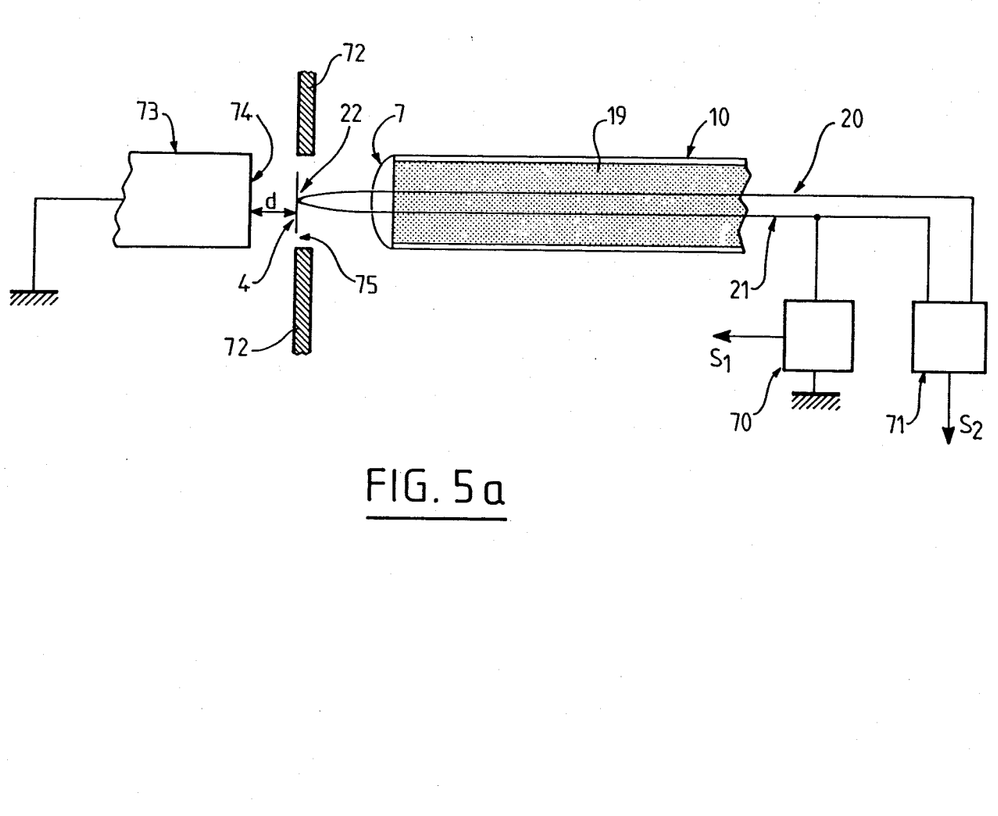
FIG. 5a shows diagrammatically the capacitive sensor mounted on the casing of a turbo-machine.

As represented in FIG. 5a, the sensor according to the invention comprises a conductive surface 4, in thermal contact with the weld 22 of a thermocouple 20, 21. The conductors 20 and 21 of the thermocouple are shielded by means of a cylindrical metallic sheath 10, from which they are separated by a mineral insulator 19. To ensure the sealing of the shielded cable thus formed, the end of the sheath 10 is closed by a plug 7, allowing passage of the end of the conductors 20, 21 on the side of the weld point 22.

For application to the determination of the characteristics of a turbo-machine, the conductive surface 4 is disposed near a succession of blades 73, by means of an opening 75 formed in the wall 72 of the casing of the turbine. Moreover, the conductive surface 4 is made integral with this casing and disposed in alignment with its internal surface, in such a manner that the distance d between the conductive surface 4 and the end 74 of a rotating blade 73 is identical to that which separates the casing 72 from this blade end.

The conductive surface 4 then defines, together with the end of a rotating blade, when this end 74 passes in proximity to the said surface, a capacitor, the capacitance of which is a function of the distance d.

By connecting the end opposite to the weld 22, of one of the conductors 20 or 21 of the thermocouple, to a circuit 70 similar to one of the circuits known from the patents cited by way of prior art GB No. -2,071,852 or FR 2,506,023, or to any other equivalent oscillating circuit, it is possible to obtain at the output of the said circuit 70 a signal $S_1$ which is a function of the capacitance of the capacitor formed by the blade end 74 and the conductive surface 4. This signal $S_1$ may be processed, in a known manner using the techniques of electronics, to determine the distance d or the speed of rotation of the turbine wheel.

By connecting the ends opposite to the weld 22 of the two conductors 20 and 21 of the thermocouple to a circuit 71 known from the techniques for measuring temperatures, it is possible to obtain a singnal $S_2$ which is a function of the temperature of the conductive surface 4 and consequently of the temperature of the casing in the vicinity of this conductive surface.

Thus, the device according to the invention permits knowledge at the same time, for the same point of the casing, of all the parameters:

clearance of the blade ends,
speed of the rotor,
temperature of the casing, which are of decisive importance in forming a slaving system permitting an actual marked improvement of the output of the engine.

To this end, it will also be particularly advantageous to dispose sensors according to the invention at a plurality of different locations of the turbo-machine in such a manner as to obtain information which is as complete as possible on the conditions of operation of the engine. In particular, these sensors will be disposed at places where the state of the gases is different, so that the temperatures are different; this involves a different development of the clearance between blade ends and casing.

For the purpose of making the sensor according to the invention capable of solving the problem of its operation at temperatures as high as those of the casings of turbo-machine, i.e. approximately 500° to 750° C., three illustrative embodiments of this sensor are presented hereinbelow.

EXAMPLE I

Figure 1A:
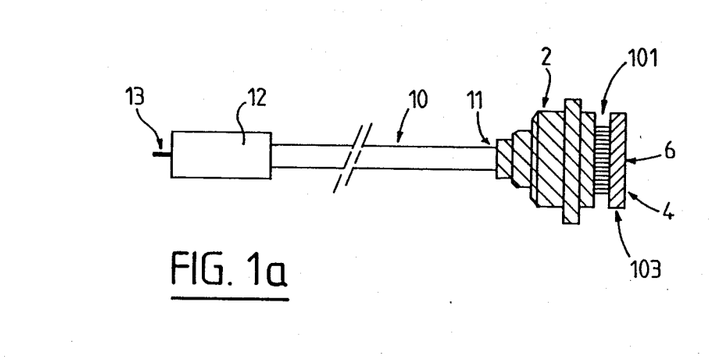
FIG. 1a shows a first embodiment of the sensor according to the invention in an external longitudinal view.
Figures 1B, 1C, 1D:
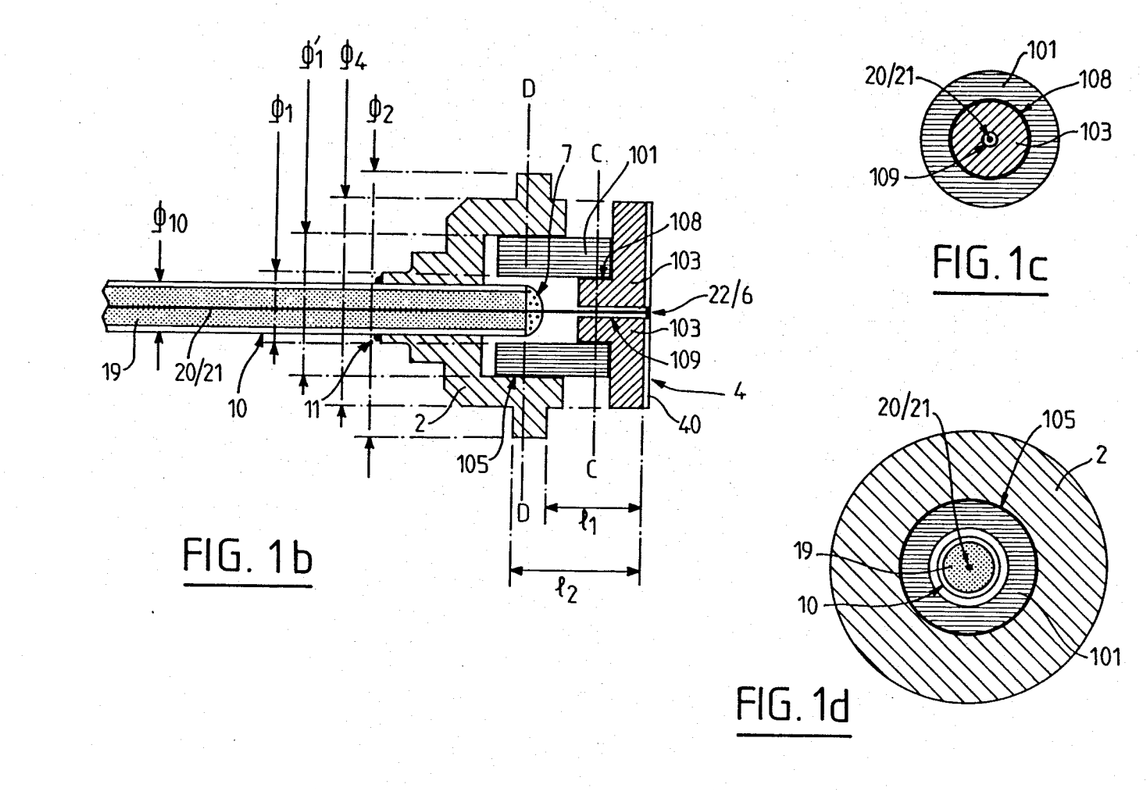
FIG. 1b shows the same sensor in longitudinal cross-section.
FIG. 1c shows the same sensor in transverse cross-section along the axis C—C of FIG. 1b.
FIG. 1d shows this same sensor in transverse cross-section along the axis D—D of FIG. 1b.

The set of FIGS. 1 illustrates this embodiment I.

FIG. 1a shows an external longitudinal view of this sensor, represented diagrammatically. As represented in this FIG. 1a, this sensor comprises a sensor body 2, welded by a weld 11 to the metallic cylindrical sheath 10, and a plug 12, 13 for connecting the conductors protected by the sheath to the electrical measurement circuits 70 and 71. The connecting plug comprises a housing 12 and pins 13.

The sensor likewise comprises an electrode head 103 having a conductive plane circular surface 4 and an electrically insulating intermediate piece 101.

All the parts of the sensor, outside the assembly formed by the conductors of the thermocouple, are bodies of revolution.

As represented in diagrammatic longitudinal cross-section in FIG. 1b, the sensor comprises:

the body of the sensor 2, equipped with an axial recess for the metallic sheath 10 of the thermocouple 20, 21, and welded by the weld 11 to this sheath;

the insulating intermediate piece 101, for example made of ceramic, in this case of annular shape to allow passage of the sheath 10, and fixed to the body 2 by a sealed brazing 105, the body 2 being equipped with an internal cavity of diameter slightly greater than the external diameter of the ring 101;

the electrode 103 equipped with a shoulder of diameter slightly less than the internal diameter of the ring 101 and on which the insulating intermediate piece 101 is fixed by a sealed brazing 108, this electrode 103 being equipped, furthermore, with an axial opening 109 to allow passage of the conductors 20, 21 of the thermocouple, and having a plane external conductive surface 4. The electrode 103 may possibly be equipped with a metallization 40 of the same surface as this conductive surface 4.

conductors 20, 21 made of materials capable of forming a thermocouple which can be used at temperatures of the order of 500 to 1,000° C., the weld point 22 of which is fixed at 6 in alignment with the external face of the electrode 103; these conductors being embedded in the mineral insulator 19 and shielded by the sheath 10, with the exception of their end close to their weld point, which is stripped to permit passage thereof into the opening 109 and the application of the weld point 22 to the point 6 where the temperature is to be measured, the sheath 10 being closed on the side where the conductors are stripped, by a sealing plug 7.

FIG. 1c represents diagrammatically a transverse cross-section of the sensor along the axis C—C. According to this cross-section, the electrode head 103 is equipped with the opening 109 for the conductors 20, 21, and the insulating intermediate piece 101 is fixed on the electrode 103 by the sealing brazing 108.

FIG. 1d represents diagrammatically a transverse cross-section of the sensor along the axis D—D. This cross-section shows the conductors 20, 21 embedded in the mineral insulator 19 and shielded by the sheath 10, the insulating annular intermediate piece 101 and the body of the sensor 2 fixed on the insulating intermediate piece 101 by a sealing brazing 105.

Table I gives dimensions of the diameters $\phi$ and indications of materials which are appropriate for constructing this sensor in this illustrative embodiment.

The welds 11 and 6 and preferably formed by laser. The sealing brazings 108 and 105 are preferably formed by means of gold (Au) or of silver-copper (Ag-Cu) which are capable of forming sealed ceramic-metal brazings at very high temperatures. When it exists, the metallization 40 of the conductive surface 4 is preferably formed by means of a layer of molymanganese (Mo/Mn) covered by a layer of nickel (Ni), the assembly having a thickness of the order of at least 0.05 mm.

After the mounting of the various elements of the sensor, the longitudinal dimensions are of the order of:

$l_1 \approx 2.85$ mm $l_2 \approx 3.85$ mm.

This sensor may be used for the measurement of the turbo-machine characteristics at temperatures of the order of 500° to 650° C.,

EXAMPLE II

The set of FIGS. 2 illustrates this embodiment.

Figure 2A:
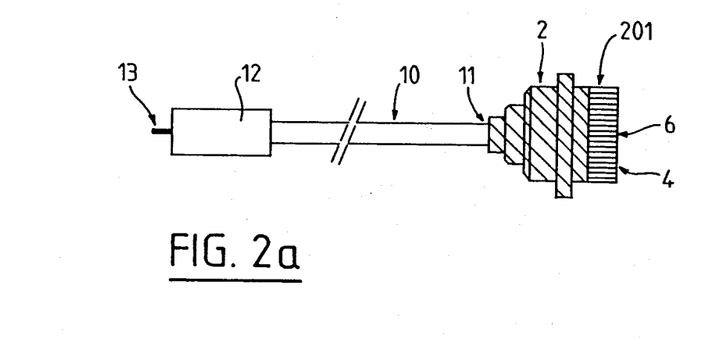
FIG. 2a shows a second embodiment of the sensor according to the invention, in an external longitudinal view.

FIG. 2a shows an external longitudinal view of this sensor, represented diagrammatically. As represented in FIG. 2a, this sensor comprises the body of the sensor 2 mounted on the sheath 10 in a manner identical to that described in Example I and a connecting plug 12, 13 which is likewise identical.

In this second example, as in the first, all the parts of the sensor, apart from the thermocouple are bodies of revolution.

Figure 2B:
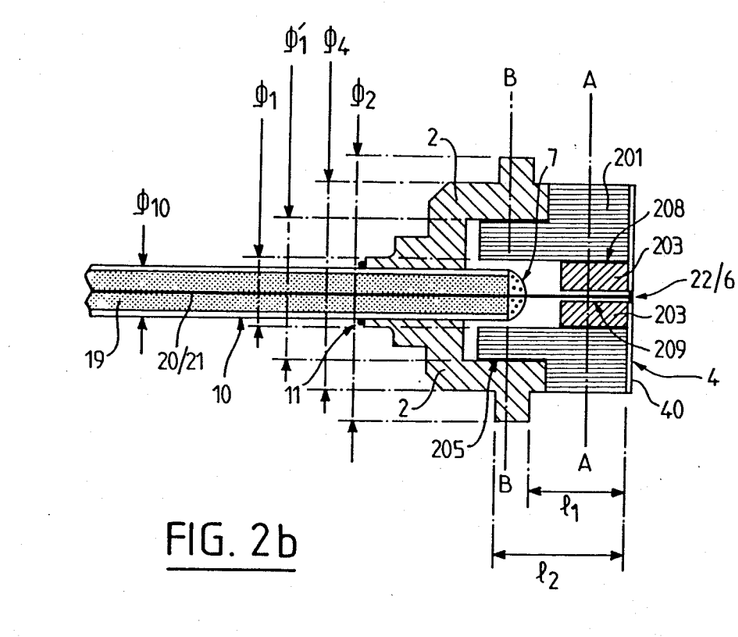
FIG. 2b shows this same sensor in longitudinal cross-section.

As represented in diagrammatic longitudinal cross-section in FIG. 2b, this sensor comprises:

the body of the sensor 2 mounted on the sheath 10, as has been stated previously;

the electrode 203, in this case of annular shape, the axial opening 209 of which is provided for the passage of the conductors 20, 21 of the thermocouple;

the insulating intermediate piece 201, which in this case has a larger volume than in Example I, which is fixed to the body 2 by the sealed brazing 205 and to the electrode 203 by the sealed brazing 208;

the conductors 20, 21 capable of forming a thermocouple, the weld point 22 of which is fixed at 6 on the external face of the electrode 203;

the metallization 40 which covers the external face of the electrode 203 and the front face of the insulating piece 201, to form the conductive surface 4. This metallization 40 is, in this case, necessary.

The other elements of the sensor are identical with those of Example I.

The sensor described in this second embodiment is intended to operate at temperatures within the range between 650° and 800° C. This effect is obtained, in relation to Example I, by providing electrode and insulating intermediate piece elements of different shapes. In fact, in this case, it is the electrode which is annular and the insulating piece which has a shoulder on which the body of the box 2 is supported. Under these conditions, the brazing surfaces between the intermediate piece and respectively the body of the sensor and the electrode, are larger and the said brazings are more sealed and tolerate better the high operating temperatures.

It is then sufficient to form the conductive surface 4 by metallization of the aligned front faces of the elements 201 and 203.

Figure 2C:
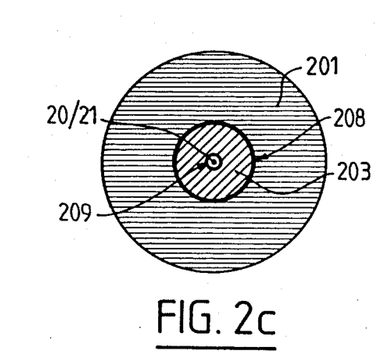
FIG. 2c shows this same sensor in transverse cross-section along the axis A—A of FIG. 2b.

FIG. 2c represents diagrammatically a transverse cross-section of the sensor along the axis A—A. This cross-section shows the electrode 203 equipped with the opening 209 for the conductors 20, 21, and the insulating intermediate piece 201 fixed on the electrode by the sealed brazing 208.

Figure 2D:
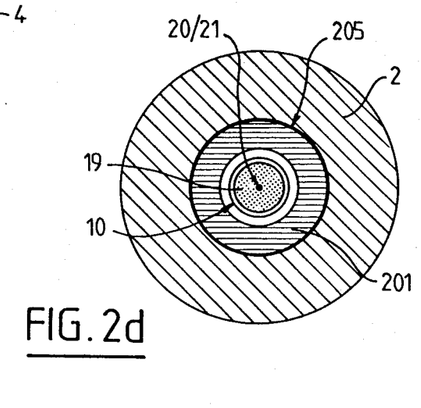
FIG. 2d shows this same sensor in transverse cross-section along the axis B—B of FIG. 2b.

FIG. 2d represents diagrammatically a transverse cross-section of the sensor along the axis B—B. This cross-section shows the conductors 20, 21 embedded in the mineral insulator 19 and shielded by the sheath 10, the insulating intermediate piece 201 and the body of the sensor 2 fixed on the latter by the sealed brazing 205.

Table II gives dimensions of the diameters $\phi$ and materials of the various pieces for a construction of this sensor.

The welds, brazings and metallizations are performed with the same means as in Example I, and the dimensions $l_1$ and $l_2$ are identical.

EXAMPLE III

Figures 3A, 3C, 3D:
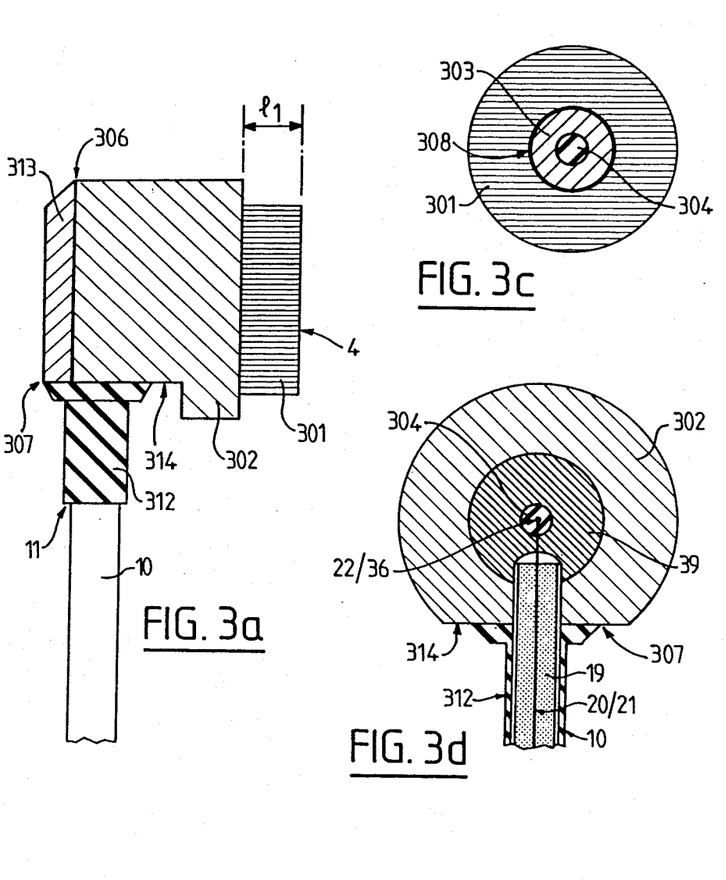
Figure 3B:
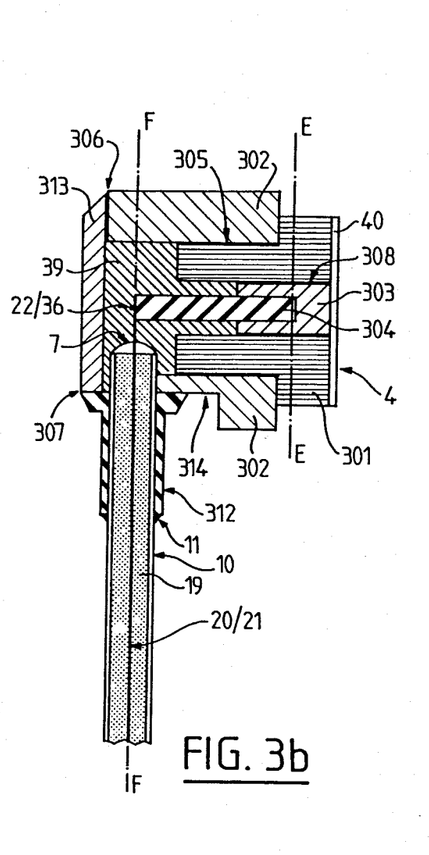
FIG. 3b shows this same sensor in longitudinal cross-section.

The set of FIGS. 3 illustrates this embodiment.

FIG. 3a shows an external longitudinal view of this sensor, represented diagrammatically. As represented in this FIG. 3a, this sensor comprises a sensor body 302, in the form of a ring, the external lateral surface of which is equipped with a flat face 314. The surface of the flat face 314 is equipped with a circular opening of diameter very slightly greater than the external diameter of the sheath 10 of the thermocouple. A sleeve 312 of internal diameter slightly greater than that of the sheath 10 is fixed by the sealed weld 11 on this sheath and by the sealed weld 307 on the flat face 314. A cap 313 applied on the rear face of the ring 302 closes sealingly this sensor body 302 by means of the weld 306. Again, FIG. 3a shows the piece referred to as the insulating intermediate piece 301 and the conductive surface 4.

As represented in diagrammatic longitudinal cross-section in FIG. 3b, the sensor of this Example III comprises:

the body of the metallic sensor 302, equipped with the flat face 314, and with the recess for the metallic sheath 10 of the thermocouple 20/21;

the metallic sleeve 312 fixed by the weld 11 to this sheath 10 and by the weld 307 to the flat face 314;

the cap 313 fixed to the body of the sensor by the weld 306;

the insulating intermediate piece 301, being a body of revolution, for example made of ceramic, having a shoulder of diameter slighly less than the internal diameter of the ring forming the body of the sensor 302, this insulating intermediate piece being fixed to the body of the sensor by a sealed brazing 305; this insulating intermediate piece 301 again having an axial cavity to receive the electrode 303;

the electrode 303, also a body of revolution, of external diameter slightly less than the internal diameter of the axial recess of the intermediate insulating piece 301, the electrode 303 and the insulating intermediate piece 301, the electrode 303 and the insulating intermediate piece 301 being fixed to one another by a sealed brazing 308 in such a manner that their front faces are aligned; the electrode 303 further having an axial cavity to receive a metallic bar 304;

the metallic bar 304, preferably chosen from the same metal as that which forms the sheath of the thermocouple, which extends from the weld point 22 of the thermocouple to the electrode 303, and which thus permits the thermal contact to be ensured between the weld point 22 of the thermocouple, welded at 36 onto the bar 304, and the conductive surface 4;

the conductive surface 4 formed by a metallization 40 constructed at the surface of the aligned front faces of the pieces 301 and 303;

the thermocouple 20, 21, its sheath 10 and its mineral insulator 19 are identical to the cases of Examples I and II.

As represented in FIG. 3c in cross-section along the axis E—E of FIG. 3b, this sensor shows the insulating piece 301, which is formed by a body of revolution, exhibiting an axial recess for the electrode 303 on which it is fixed by the brazing 308; and the metallic bar 304 in an axial recess of the electrode 303.

As represented in FIG. 3d, in cross-section along the axis F—F of FIG. 3b, this sensor comprises the body of the sensor 302 equipped with the flat face 314, a radial opening perpendicular to the flat face 314 for the introduction of the sheath 10 of the thermocouple 20, 21 in such a manner that the weld point 22 comes substantially to the centre of symmetry of the device in coincidence with the end of the bar 304 on which this weld point is welded at 36.

The gap between the various parts 304, 303, 301, 302, the cap 313 and the thermocouple may favourably be filled with a mineral insulator in the form of powder 39, for example the same as the mineral insulator 19, or one of the possible materials for constituting the mineral insulator 19.

The dimension $l_1$ is favourably 2 mm. The external diameter $\phi_4$ of the insulating piece 301 is favourably 6 mm, and the external diameter $\phi_2$ of the body of the sensor 7.8 mm.

This sensor may be used for the measurement of the characteristics of an engine of a helicopter or of a small aircraft, at temperatures of the order of 700° C.

The Table III gives an example of dimensions and materials for constructing the sensor described in this Example III.

It will be noted that the dimensions which are not given are not critical.

In each one of these embodiments it will be possible to use, in order to construct the thermocouple shielded with mineral insulator, a transmission cable of the brand THERMOCOAX of reference 2ABI15 or 2 PRe Re 15 for example, of length $l \approx 10^3$ mm.

Figure 4A:
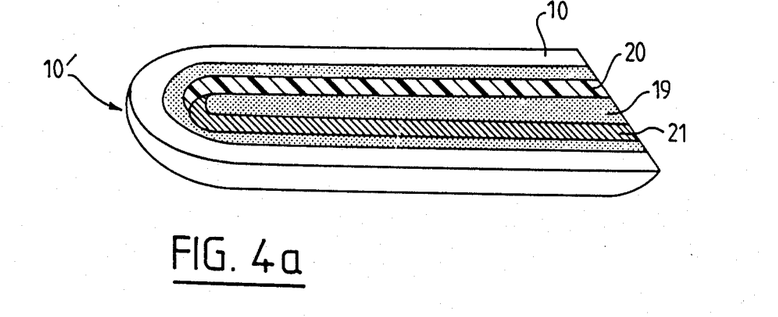
FIG. 4a shows a standard thermocouple before its incorporation in the sensor according to the invention.

This cable is partially represented in longitudinal cross-section and in perspective in FIG. 4a. Preferably it has a sheath 10 made of Inconel (2ABI15) or made of rhodanized platinum (2 PRe Re 15) which is cylindrical, which contains two conductors 20 and 21 which are preferably made of Chromel-Alumel (2ABI15), of nicrosil and nisil, or of rhodanized platinum-platinum respectively, insulated from one another and insulated from the sheath by a powder of mineral insulator 19 which is compacted and which will preferably be chosen from among MgO, HfO$_2$ and BN.

The cable is terminated by a rounded part 10' which corresponds to the weld point 22 of the two conductors.

Figure 4B:
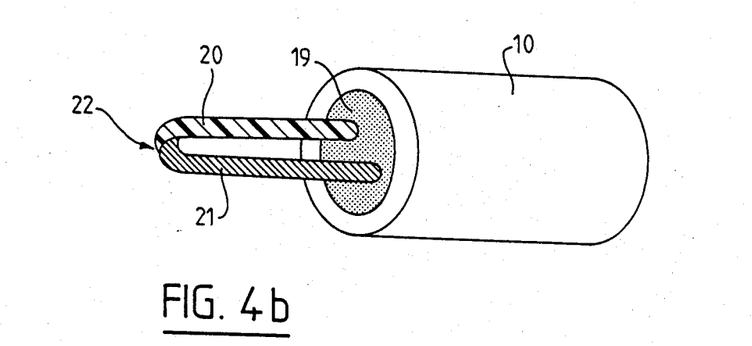
FIG. 4b shows this thermocouple in a first step of its preparation with a view of the assembly in the sensor.

For use for the purposes of the invention, the sheath 10 is cut in proximity to the weld point 22 to strip the conductors 20, 21 and the weld point, over a length of approximately 3.5 mm, as is shown in perspective in FIG. 4b.

Figure 4C:
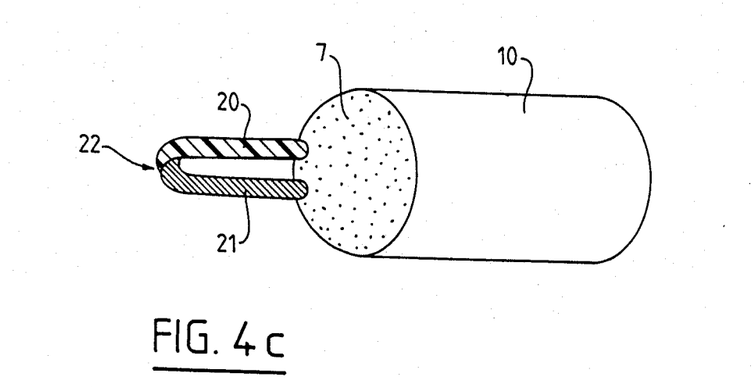
FIG. 4c shows this thermocouple in the final step of its preparation with a view to the assembly in the sensor.

Then, the sheath is obturated in a sealded manner, at the location of the cut, by a plug 7. For the purposes of the invention, this plug will advantageously be formed by means of the sealing material described in the Patent FR 1590777 and which is composed of

| | |
|---|---|
| SiO$_2$ ≈ 10% in moles | CaO ≈ 20% in moles |
| B$_2$O$_3$ ≈ 35% in moles | ZnO ≈ 35% in moles | the sealing being effected at a temperature of the order of 1,000° C. The cable then has the appearance shown in perspective in FIG. 4c.

According to the invention, the body of the sensor, the insulating intermediate piece and the electrode, in each one of the examples described, are placed in position and brazed relative to one another. Then, in the Examples I and II, the stripped conductors 20, 21 are introduced into the opening 109, 209 of the electrode 103, 203 and the weld point 22 is welded by laser to the point 6 of the front surface of the electrode, while the sheath 10 is fixed to the body of the sensor 2 by the laser weld 11. In the Example III, the weld point 22 is welded to the end of the bar 304 after the latter has been put in position in the recess provided to this end in the electrode 303, and after the sheath of the thermocouple has been introduced into the axial recess of the body 302. The cavity of the body 302 is then filled with mineral insulator powder, for example MgO, and the cap 313 and the sleeve 312 are fixed by the laser welds 306, 307 and 11 respectively. In the Examples I and II, the sheath 10 is likewise fixed to the body 2 by the laser weld 11.

Finally, the front face of the various sensors is equipped, if necessary, with the metallization 40.

To place the sensor in position on the casing 72 of the turbine, there are provided in the wall of the latter small circular openings 75 (FIG. 5a) of diameter slightly greater than $\phi_4$.

Figure 5B:
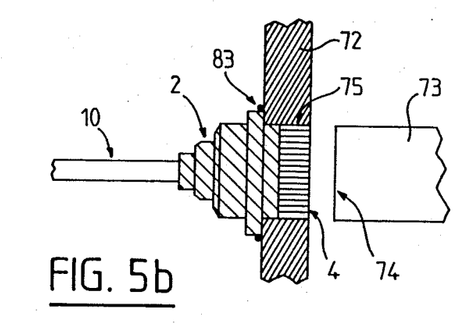
FIGS. 5b, 5c show embodiments of a device for fixing the sensor on the wall of a casing.

As represented in partial cross-section in FIG. 5b, the sensor may be introduced into the opening 75 and fixed to the casing 72 by a weld 83 in such a manner that the conductive surface 4 is in alignment with the internal surface of the sensor.

Figure 5C:
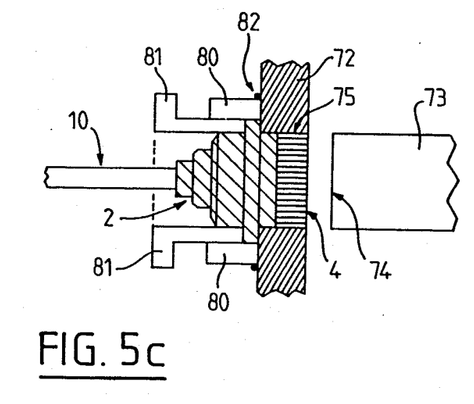

As represented in partial cross-section in FIG. 5c, the sensor may be introduced into the opening 75 right around which an arbor 80 is welded at 82. The sensor is then retained in position by the locking screw 81 in the axial opening of which the sensor has previously been introduced.

From the various embodiments described, it emerges that the means permitting the implementation of the construction of a sensor according to the invention are, in a general way:

1. a thermocouple 20, 21, preferably equipped with a sheath 10, from which it is insulated by a mineral insulator 19, and stripped to leave free the weld point 22 of the conductors 20, 21;

2. a conductive surface 4 to form one of the plates of the capacitor, the other plate of which is the end of a rotating blade of the turbo-machine, being a conductive surface which is, moreover, in electrical and thermal contact with the weld point 22 of the thermocouple 20 or 21;

3. means for effecting the electrical and thermal contact between the weld point 22 of the thermocouple 20, 21 and the conductive surface 4, being means which comprise at least the electrode 103, 203, 303 and, depending upon the particular case, either an opening 109, 209 in the electrode 103, 203 with weld 6 of the weld point 22 on the front face of the electrode, or a bar 304, one end of which is in thermal contact with the electrode 303 with weld 36 of the weld point 22 at the other end of the bar 304.

4. a metallic sensor body (2, 302) which has an opening for the passage of the sheath 10 of the thermocouple 20, 21, sealingly fixed to this sheath; 5. an insulating intermediate piece (10, 20, 30) sealingly fixed on the one hand to the body of the sensor (2, 302) and on the other hand to the electrode 103, 203, 303;

6. circuits for measuring the capacitance of the capacitor and the temperature of the conductive surface, connected to the free ends of the conductors 20, 21 of the thermocouple.

In a preferred construction, the device according to the invention will then comprise a circuit for slaving the speed of the rotor to obtain an optimal clearance between casing and blades as a function of the temperature. The electronic circuits associated with the sensor according to the invention are not described here as forming part of known fields of electronics.

TABLE I

| Elements of the sensor | Materials | Diameters in mm |
|---|---|---|
| Sheath 10 | Inconel | $\phi_{10}$ ≈ 1.5 |
| Body 2 | Ferro nickel | $\phi_2$ ≈ 7.8 |
| Electrode 103 | Ferro nickel or platinum | $\phi_4$ ≈ 6 |
| Insulating piece 101 | Al$_2$O$_3$ | $\phi_1$ ≈ 1.6; $\phi'_1$ ≈ 3.5 |

TABLE II

| Elements of the sensor | Materials | Diameters in mm |
|---|---|---|
| Sheath 10 | Inconel | $\phi_{10}$ ≈ 1.5 |
| Body 2 | Ferro nickel | $\phi_2$ ≈ 7.8 |
| Electrode 203 | Ferro nickel or platinum | $\phi_1$ ≈ 1.5 |
| Insulating piece 201 | Al$_2$O$_3$ | $\phi'_1$ ≈ 3.5; $\phi_4$ ≈ 6 |

TABLE III

| Elements of the sensor | Materials | Diameters in mm |
|---|---|---|
| Sheath 10 | Inconel | $\phi_{10}$ ≈ 1.5 |
| Body 302 | Ferro nickel | $\phi_2$ ≈ 7.8 |
| Electrode 303 | Ferro nickel or platinum | |
| Bar 304 | Inconel or rhodium alloy | |
| Insulating piece 301 | Al$_2$O$_3$ | |
| Filling insu- | MgO, HfO$_2$, BN | $\phi_4$ ≈ 6 |

TABLE III-continued

| Elements of the sensor | Materials | Diameters in mm |
|---|---|---|
| lator 39 | | |

We claim:

1. A capacitive sensor for the measurement of at least one characteristic of a turbo-machine under dynamic conditions, said turbo-machine having a casing and rotating blades adjacent said casing, said sensor comprising a conductive surface fixed to said casing approximate said rotating blades to form a first plate of a capacitor, said capacitor's second plate comprising each one of the ends of said rotating blades when passing in proximity to said conductive surface, said sensor also comprising an electrical interconnection means to connect said conductive surface to a first electrical detection means for measuring the variations of the capacitance of said capacitor, wherein said electrical interconnection means also constitutes a means to connect said conductive surface to a second electrical detection means for measuring the temperature of said casing in the region of said conductive surface, said electrical interconnection means including conductors of a thermocouple and means for coupling said thermocouple in electrical and thermal contact with said conductive surface, said means for coupling said thermocouple comprising at least one metallic electrode having a plane front face which cooperates with said conductive surface, said thermocouple being in electrical and thermal contact with this electrode, said thermocouple being surrounded by a shielding comprising a cylindrical metallic sheath, said sheath having an aperture whereby said thermocouple can electrically and thermally contact said electrode.

2. A capacitive sensor according to claim 1, characterized in that an insulating intermediate piece made of ceramic is sealingly brazed onto the electrode, and a metallic sensor body is sealingly brazed both onto the sheath of the thermocouple and onto the intermediate insulating piece, the body of the sensor and the intermediate piece being equipped with recesses to allow the sheath of the thermocouple to pass.

3. A capacitive sensor according to claim 1, characterized in that the electrode is equipped with an axial opening to pass the end of the conductors of the thermocouple, and in that the weld point of the thermocouple is fixed in alignment with the plane front face of the electrode and on this plane front face, and in that the recess of the body of the sensor for the sheath is axial, and the latter fixed to the body by a sealed weld.

4. A capacitive sensor according to claim 3, characterized in that the insulating intermediate piece has an annular shape, of internal diameter slightly greater than the external diameter of the sheath of the thermocouple, in that it is fixed on the one hand on a shoulder of the electrode, this shoulder having an external diameter slightly less than the internal diameter of the annular insulating piece, and in that it is fixed on the other hand in an internal recess of the sensor body which has a diameter slightly greater than the external diameter of the annular insulating piece, the plane front face of the electrode forming the conductive surface, which is possibly covered with a metallization.

5. A capacitive sensor according to claim 3, characterized in that the insulating intermediate piece is a body of revolution, having an axial recess of diameter slightly greater than the external diameter of the sheath, having a part of exernal diameter equal to that of the conductive surface and having a part forming a shoulder of intermediate external diameter, in that the electrode is of annular shape of external diameter slightly less than the internal diameter of the insulating piece, in that the body of the sensor is a body of revolution and has an axial recess of internal diameter slightly greater than that of the shoulder of the insulating piece, and in that the body of the sensor is fixed by its recess on the shoulder of the intermediate piece, the latter being fixed by its axial recess on the external surface of the electrode in such a manner that the front faces of the electrode and of the insulating piece are in alignment and are equipped with a metallization to form the conductive surface.

6. A capacitive sensor according to claim 2, characterized in that the electrode is equipped with an axial recess, disposed on the side opposite to the plane surface carrying the conductive surface, the recess being appropriate to receive an end of a metallic bar, and in that the weld point of the thermocouple is fixed to the other end of the metallic bar.

7. A capacitive sensor according to claim 6, characterized in that the electrode, its axial recess and the metallic bar are bodies of revolution, the external diameter of the bar being slightly less than the internal diameter of the recess of the electrode, in that the insulating intermediate piece is a body of revolution, having an axial recess of diameter slightly greater than the external diameter of the electrode, a part of external diameter equal to that of the conductive surface and a part forming a shoulder of intermediate external diameter, in that the body of the sensor is annular and has an axial recess of internal diameter slightly greater than the intermediate diameter of the insulating intermediate piece, in that the body of the sensor further comprises a radial circular opening, formed perpendicular to a lateral flat face, having a diameter slightly greater than that of the sheath, in that the body of the sensor is fixed by its recess on the shoulder of the intermediate piece, the latter being fixed by its axial recess on the external surface of the electrode in such a manner that the front surface of the electrode and of the insulating piece are in alignment and are equipped with a metallization to form the conductive surface, in that the sheath of the thermocouple being introduced into the raidal opening of the body, the weld point of the thermocouple being fixed on one of the ends of the bar and the other end of the bar being in position in the axial recess of the electrode, a closure cap is fixed in a sealed manner on the face of the body opposite to the conductive surface and the sheath of the thermocouple is retained by a sleeve fixed both to the sheath and to the body in a sealed manner, and in that the hollow part of the body of the sensor is filled with mineral insulator in the form of powder.

* * * * *